United States Patent
Liu et al.

(10) Patent No.: US 9,883,082 B2
(45) Date of Patent: Jan. 30, 2018

(54) TIMING BASED CORRECTOR FOR VIDEO

(71) Applicant: Lattice Semiconductor Corporation, Portland, OR (US)

(72) Inventors: Genlin Liu, Shanghai (CN); Bing Zhang, Shanghai (CN)

(73) Assignee: Lattice Semiconductor Corporation, Portland, OR (US)

(*) Notice: Subject to any disclaimer, the term of this patent is extended or adjusted under 35 U.S.C. 154(b) by 0 days.

(21) Appl. No.: 15/520,349

(22) PCT Filed: Oct. 30, 2014

(86) PCT No.: PCT/CN2014/089879
§ 371 (c)(1),
(2) Date: Apr. 19, 2017

(87) PCT Pub. No.: WO2016/065571
PCT Pub. Date: May 6, 2016

(65) Prior Publication Data
US 2017/0318198 A1    Nov. 2, 2017

(51) Int. Cl.
*H04N 5/06* (2006.01)
*H04N 5/95* (2006.01)

(52) U.S. Cl.
CPC ............. *H04N 5/06* (2013.01); *H04N 5/95* (2013.01)

(58) Field of Classification Search
CPC .. H04N 5/04; H04N 5/06; H04N 5/95; H04N 5/08; H04N 5/213; H04N 5/12
USPC ....... 348/497, 521, 529, 533, 534, 547, 500; 375/354, 371
See application file for complete search history.

(56) References Cited

U.S. PATENT DOCUMENTS

| | | | |
|---|---|---|---|
| 2005/0062887 A1* | 3/2005 | Choi | H04N 5/06 348/511 |
| 2008/0266454 A1* | 10/2008 | Lin | H04N 5/04 348/547 |
| 2012/0147267 A1 | 6/2012 | Ryan et al. | |

FOREIGN PATENT DOCUMENTS

| | | |
|---|---|---|
| CN | 1812483 A | 8/2006 |
| CN | 1853410 A | 10/2006 |
| CN | 1960461 A | 5/2007 |

OTHER PUBLICATIONS

PCT International Search Report and Written Opinion, PCT/CN2014/089879, dated Jun. 12, 2015, 11 pgs.

* cited by examiner

*Primary Examiner* — Sherrie Hsia
(74) *Attorney, Agent, or Firm* — Fenwick & West LLP

(57) ABSTRACT

A device that stabilizes video timing signals from an analog video signal is provided. In one embodiment, such a device includes a video PLL controller and a vertical synchronization (Vsync) signal generator. The device output a clock for digital video data, where the clock follows the Vsync signal from the analog video but within the jitter requirements for the clock.

19 Claims, 2 Drawing Sheets

TIMING BASED CORRECTOR FOR VIDEO

BACKGROUND

1. Field of the Disclosure

This disclosure pertains in general to video processing, and more specifically to timing based correctors for stabilizing video timing.

2. Description of the Related Art

Analog video (e.g., composite video in formats such as NTSC, PAL and SECAM, sometimes referred to as CVBS) has timing typically defined by vertical synchronization (Vsync) and horizontal synchronization (Hsync) signals. However, the timing defined by these signals may wander in a manner that is out of compliance with requirements for digital video.

For example, an analog phase-locked loop (APLL) may be used to lock the analog video when converting to digital. However, the timing of the analog video can vary. For example, the horizontal line timing may wander between longer and shorter durations. The analog video signal may be sampled with variable timing and will therefore produce a digital video signal that also varies in timing. The variability can be so large that the resulting digital video signal will be out of compliance. For example, the digital video signal may be clocked by a pixel clock that has a jitter requirement that is more stringent than the variability in the analog timing.

For example, the High Definition Multimedia Interface (HDMI) specification limits clock jitter to around 0.3 Tbit, which is about a 3% jitter tolerance on the clock period. Tolerances may also be driven by other requirements, such as a stricter requirement on audio signals. For example, some televisions permit only +/−1 or +/−2 audio Compliance Test Specification step variation.

Timing Based Correctors (TBCs) may be used to condition the video timing signals. Frame TBCs may smooth video displays by using a stable oscillator and a frame buffer. Digital data for each frame of analog video is stored to the frame buffer and then transmitted out of the frame buffer according to a fixed frequency clock based on the oscillator. In this way, the digital video data is clocked by a clock which stability is determined by the stability of the oscillator rather than by the stability of the analog timing signals. However, this solution is expensive because it requires a buffer large enough to store at least an entire frame of data. This requires silicon area and pin resources.

In contrast, line TBCs buffer a few lines of video data rather than an entire frame. The buffered lines are clocked out by a clock based on a stable oscillator. This is less costly than a frame TBD, but line TBCs have their own drawbacks. It is not uncommon for line TBCs to drop or repeat video data, even during normal play mode. Because input video timing may vary significantly, video content received in line buffers may vary substantially. Video content received in line buffers may not be sufficient for display, or video content may exceed the capacity of line buffers.

As a result, there is a need for better solutions to stabilize video timing signals when converting audio video signals to digital.

SUMMARY

Embodiments of the present disclosure are related to a device that stabilizes video timing signals. Various embodiments are configured to generate an output video clock signal based on an input Vsync signal of an analog video signal, but without exceeding jitter requirements on the output video clock signal.

In one implementation, such a device includes a video PLL controller and a Vsync generator. The video PLL controller may include a phase frequency detector, a digital filter, and a limiter module. The Vsync generator may include a pixel clock generator and a video timing generator. The video PLL controller generates a fraction based on the difference between the input Vsync signal and an output Vsync signal. The Vsync generator generates a set of video timing signals including the output Hsync, output Vsync, and data enable ("DE"). The set of video timing signals may be provided to a TBC controller along with the video data, the input Vsync signal, and the input Hsync signal. The video data may be written into a line buffer according to the input timing signals and read out from the line buffer according to the output timing signals.

This type of device may be used for many applications, including converting an analog video signal to a digital video signal. In one implementation, the device is implemented with a CVBS decoder, a TBC controller, a line buffer, and an HDMI encoder. The device regulates the video timing signal of the analog video signal such that the output video clock of the output video from the line buffer complies with the jitter requirements. Various embodiments may include a fully controllable phase lock loop ("PLL") that includes an analog PLL and a digital PLL. A clock frequency may be regulated to follow the input Vsync rate and to comply with jitter requirements. Picture rolling, artificial picture in normal play mode, video black screen, audio mute issues and many other issues may be avoided.

Other aspects include components, devices, systems, improvements, methods, processes, applications and other technologies related to the foregoing.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
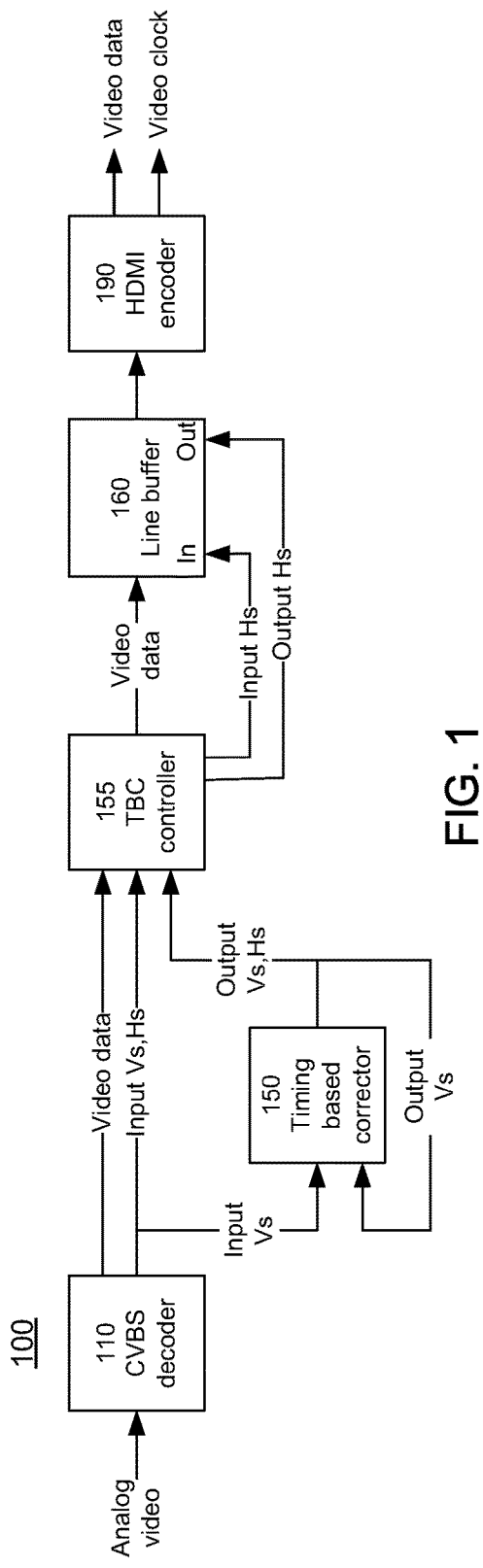
FIG. 1 is a block diagram of an example device for converting an analog video signal into digital video data and corresponding clock.

FIG. 1 is a block diagram of an example device for converting an analog video signal into digital video data and corresponding clock. The device 100 includes a CVBS decoder 110, a timing based corrector (TBC) 150, a TBC controller 155, a line buffer 160, and an HDMI encoder 190. In this example, the CVBS decoder is coupled to the TBC 150 and the TBC controller 155. The TBC 150 is coupled to the TBC controller 155, which is coupled to the line buffer 160. The line buffer 160 is further coupled to the HDMI encoder 190. The HDMI encoder is just an example. Digital video formats other than HDMI may also be used.

The CVBS decoder 110 decodes an incoming video signal into digital video data with timing signals such as a vertical synchronization (Vsync) signal and a horizontal synchronization (Hsync) signal. In some embodiments, the incoming video signal is the sampled version of the analog video signal. For example, the digital video data may be YUV format of a video frame. Other digital video formats may also be used.

The timing signals generated by the CVBS decoder will be referred to as "input" timing signals because they are based on the timing signals from the analog video signal and will suffer from the same timing variability as the original analog timing signals. For example, the input Vsync and Hsync signals (denoted as input Vs, Hs in the figure) may be sampled versions of the analog Vsync and Hsync signals. If the output video clock were based directly on these input Vsync and Hsync signals, it would also suffer from the same timing variability which might make the output video clock non-compliant with its timing requirements.

The TBC 150 stabilizes these timing signals such that the output video clock signal complies with its jitter requirements. In this example, the TBC 150 receives the time varying input Vsync signals and generates a more stable output Vsync signal while still trying to follow the input Vsync signal. An output Hsync signal is generated from the output Vsync signal. These adjusted signals, rather than the input Vsync and Hsync signals, are used to time the digital video data. That is, the output video clock signal is generated based on the output Vsync and Hsync signals, rather than based on the input Vsync and Hsync signals.

The TBC controller 155 receives the digital video data and multiple sets of timing signals. These may come from both the CVBS decoder 110 and the TBC 150. The TBC controller 155 controls the line buffer 160 based on these timing signals. In the example of FIG. 1, the digital video data is written into the line buffer 160 clocked by the original timing signals generated by the CVBS decoder 110 (i.e., the input Hsync and Vsync signals and data enable (DE).) The digital video data is read out of the line buffer clocked by the timing signals generated by the TBC 150 (i.e., the output Hsync and Vsync signals and data enable (DE).)

The TBC may automatically readjust the output clock frequency to follow the input Vsync rate. Picture display may be returned back to normal quickly. For example, when the source video is in the worst case, output video content may be broken. In other words, excessive variation in timing signals of the source video may cause broken video content because line buffers cannot compensate the huge timing variation. When the source video returns to normal from the worst case, the line buffer write and read pointer may be reset such that the output video may be reset back to normal immediately.

The digital video data is transmitted to the HDMI encoder 190 from the line buffer 160 according to the timing signals generated by the TBC 150. The digital video data is encoded by the HDMI encoder 190 into an HDMI digital video data signal with a corresponding video clock signal (e.g., pixel clock). This video clock signal is based on the output Vsync and Hsync signals, which have been conditioned by the TBC 150 so that the resulting video clock signal is compliant with its jitter requirements.

Figure 2:
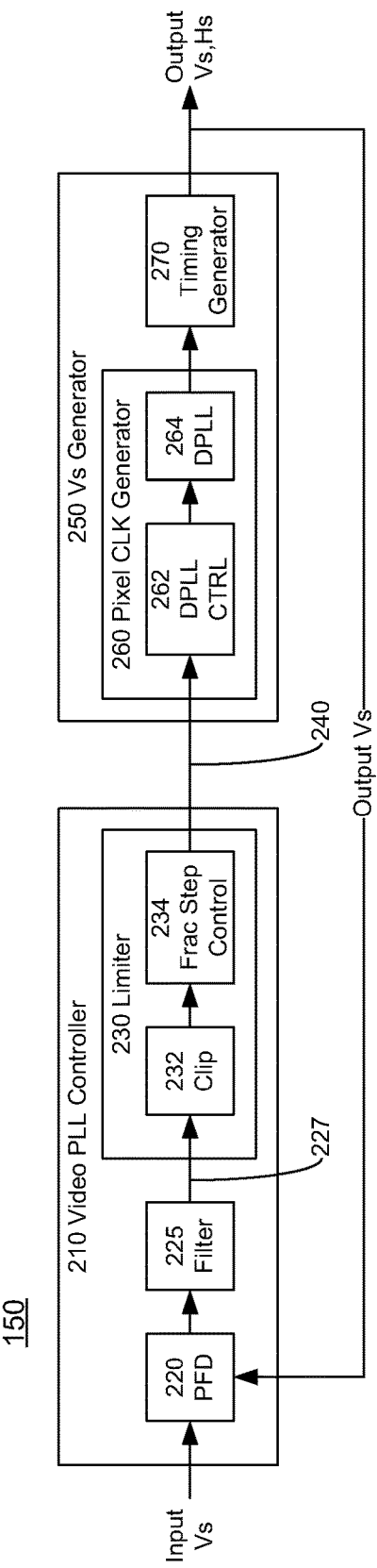
FIG. 2 is a block diagram of an example timing based corrector for stabilizing timing signals, suitable for use in the device of FIG. 1.

FIG. 2 is a block diagram of an example timing based corrector for stabilizing timing signals, suitable for use in the device of FIG. 1. At a high level, the TBC 150 includes a video PLL controller 210 and a Vsync generator 250. The video PLL controller 210 compares the input Vsync signal and the output Vsync signal and generates a control signal 240 used to adjust the output Vsync signal. The control signal 240 is designed so that the output Vsync signal tries to synchronize with the input Vsync signal but within limits so that the output video clock does not exceed its jitter requirements. For example, if the input Vsync signal varies too rapidly (i.e., in a manner that would cause the output video clock to exceed its jitter tolerance), the control signal 240 will cause the output Vsync signal to vary less rapidly. The control signal 240 is received by the Vsync generator 250, which generates the output Vsync signal according to the control signal. In this example, the Vsync generator 250 also produces the output Hsync signal, based on the output Vsync signal (rather than by adjusting the input Hsync signal).

FIG. 2 also shows example embodiments of the video PLL controller 210 and Vsync generator 250. In this example, the video PLL controller 210 includes a phase frequency detector (PFD) 220, a digital filter 225, and a limiter module 230. The PFD 220 determines a phase difference between the input Vsync signal and the output Vsync signal. The PFD 220 tracks the input Vsync signal from two directions (i.e., can compare the output Vsync signal to either the input Vsync signal immediately before or to the input Vsync signal immediately after). Thus, the PFD 220 may always track the input Vsync signal that is closest to the output Vsync signal, such that the phase difference between the input Vsync signal and the output Vsync signal does not exceed 180 degrees (or 50% duty cycle).

The digital filter 225 filters the phase difference and generates a Vsync adjustment signal 227. In one embodiment, the digital filter 225 is a feed forward $2^{nd}$-order loop filter, which may improve the phase-locked loop locking behavior. The digital filter 225 may add a zero point to stabilize the phase lock loop thereby removing or reducing phase lock overshooting.

The Vsync adjustment signal 227 may result in an output video clock that exceeds jitter requirements. Therefore, the Vsync adjustment signal 227 is provided to the limiter module 230 which outputs a limited Vsync adjustment signal 240. In various embodiments, the limited Vsync adjustment signal 240 is a fraction step (as will be described in more detail below). In the example of FIG. 1, the limiter module 230 includes a clip module 232 and a fraction step controller 234. The clip module defines a predetermined range for the adjustment signal, including an upper limit and a lower limit (e.g., −f to +f) for the output frequency for updating the fraction step. As such, the Vsync adjustment signal 227 is clipped by the clip module 232 to a predefined range such that the output video clock meets the jitter requirements.

The fraction step controller 234 limits the adjustment step. That is, the fraction step controller 234 determines a schedule for updating the fraction step to regulate the adjustment step and the adjustment speed. The fraction step controller 234 generates the fraction step 240 based on the clipped Vsync adjustment signal 227. In one embodiment, the fraction step is updated at each frame. In another embodiment, the fraction step is updated every several lines.

In some embodiments, the adjustment step and/or the adjustment speed are externally configurable.

The example Vsync generator 250 shown in FIG. 2 includes a pixel clock generator 260 and a video timing generator 270. The pixel clock generator 260 generates a pixel clock signal (i.e., the output video clock) for the video data. The video timing generator 270 generates a set of video timing signals including the output Hsync, output Vsync, and data enable (DE), consistent with the pixel clock signal. The pixel clock signal complies with the jitter requirements.

In one implementation, the pixel clock generator 260 includes a digital PLL (DPLL) controller 262 and a DPLL 264. The DPLL controller 262 generates a digital PLL control signal, which controls generation of the pixel clock signal by the DPLL 264. In this example, the DPLL controller 262 generates an output Hsync signal based on the limited Vsync adjustment signal 240 (i.e., the fraction step generated by the fraction step controller 234).

The DPLL controller 262 determines the period for generating the output Hsync signal. The period may vary slightly from one Hsync signal to the next. In some embodiments, the period is defined relative to a fixed clock. In the following example, the clock is fixed at 108 MHz (8*13.5 MHz), and the period for generating the output Hsync signal is adjusted by adjusting the number of clock cycles per period. The Hsync period is defined by a base (i.e., Hsync period base) and an offset (i.e., Hsync period offset). In this example, the Hsync period base is set to 6912 (the number of cycles of a 108 MHz clock when Hsync is perfectly timed with no jitter) for CVBS video signals. Then, $$(108*6912)/(Hs \text{ period})=(N \cdot F*24)/7 \quad (1),$$

where N is the PLL integer and F is the PLL fraction part, (N·F*24)/7 is the DPLL output clock frequency, N·F is the configuration input to the DPLL 264, 24 MHz is the reference clock of the DPLL 264, and 7 is the post divider value. Accordingly, the Hsync period offset may be represented by $$\text{delta\_}n \approx \text{delta\_}f*6912/31.5 \quad (2),$$

where delta_f is the difference between 0.5 and the PLL fraction step generated by the video PLL controller 210, and delta_n is the Hsync period offset. When N·F is 31.5, the clock signal generated is 108 MHz. The ratio of the time difference between Hsync and 6912 equals to the ratio of the difference between N·F and 31.5.

The DPLL 264 generates a pixel clock signal according to the control signal provided by the DPLL controller 262. The pixel clock signal is subsequently provided to the video timing generator 270, which generates a set of video timing signals according to the pixel clock signal. The video timing generator 270 generates the output Hsync signal and the output Vsync signal, according to which the digital video data for each frame is read out from the line buffer. The pixel clock generator 260 may include a divider that is configured to divide the frequency of the pixel clock signal. In one embodiment, the output pixel clock signal is 13.5 MHz.

Figure 3:
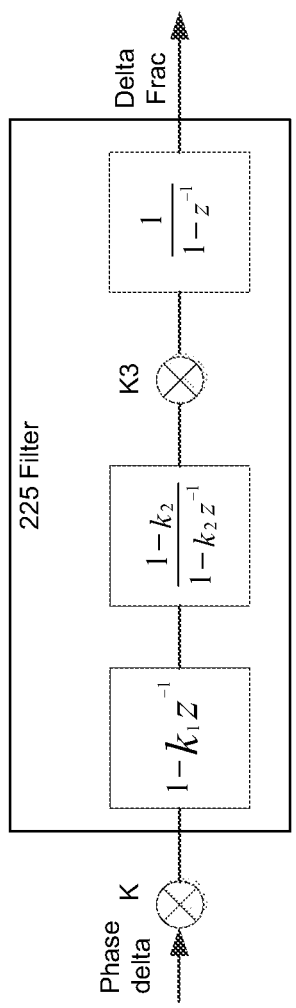
FIG. 3 is a block diagram of a digital filter, suitable for use in the timing based corrector of FIG. 2.

FIG. 3 is a block diagram of a digital filter, suitable for use in the timing based corrector of FIG. 2. As illustrated, the filter 225 is a feed forward similar second-order loop filter. The transfer function for this filter is $$H(z) = k(1 - k_1 z^{-1}) \cdot \frac{1 - k_2}{1 - k_2 z^{-1}} \cdot \frac{1}{1 - z^{-1}}. \quad (3)$$

Upon reading this disclosure, those of skill in the art will appreciate still additional alternative designs. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A device for generating an output vertical synchronization (Vsync) signal based on an input Vsync signal of an analog video signal, subject to jitter requirements on an output video clock signal based on the output Vsync signal, the device comprising:
   a phase frequency detector configured to generate a phase difference between the input Vsync signal and the output Vsync signal;
   a digital filter configured to filter the phase difference to produce a Vsync adjustment signal;
   a limiter module configured to limit the Vsync adjustment signal such that the output video clock signal is compliant with the jitter requirements; and
   a Vsync generator configured to adjust timing of the output Vsync signal to follow the input Vsync signal based on the limited Vsync adjustment signal.

2. The device of claim 1 wherein the limiter module clips the Vsync adjustment signal to remain below a predefined frequency consistent with the jitter requirements on the output video clock signal.

3. The device of claim 1 wherein the output video clock signal is a pixel clock signal for digital video data corresponding to the analog video signal, the device further comprising:
   a pixel clock generator configured to generate the pixel clock signal according to the limited Vsync adjustment signal, wherein the pixel clock signal is compliant with the jitter requirements.

4. The device of claim 3 wherein:
   the pixel clock generator comprises a digital phase lock loop (DPLL) configured to generate a horizontal synchronization (Hsync) signal according to an Hsync period having a base period and an offset, the offset based on a fractional step; and
   the limiter module comprises a fractional step controller configured to output the fractional step based on the limited Vsync adjustment signal.

5. The device of claim 4 wherein the pixel clock generator comprises a divider configured to divide the frequency of the pixel clock signal.

6. The device of claim 4 wherein the fractional step controller is configured to update the fractional step periodically for every frame of a video.

7. The device of claim 4 wherein the fractional step controller is configured to update the fractional step periodically for every set of a predefined number of lines of a video.

8. The device of claim 4 wherein the fractional step controller is configured to update the fractional step according to a predetermined frequency that is externally configurable.

9. The device of claim 3 further comprising:
   a video timing generator configured to generate an Hsync signal and the output Vsync signal based on the pixel clock signal.

10. The device of claim 1 wherein the digital filter is a feed forward second order digital filter.

11. The device of claim 1 wherein the phase difference is between the output Vsync signal and the input Vsync signal nearest in phase to the output Vsync signal, such that the phase difference does not exceed 180 degrees.

12. The device of claim 1 further comprising:
- a CVBS decoder configured to receive the analog video signal and generate the input Vsync signal therefrom and further to generate a digital video data corresponding to the analog video signal.

13. The device of claim 12 further comprising:
- a line buffer configured to receive the digital video data from the CVBS decoder; and
- a video timing generator configured to generate an output Hsync signal according to the limited Vsync adjustment signal such that the output Hsync signal is consistent with the jitter requirements, wherein the digital video data is clocked out of the line buffer according to a clock based on the output Hsync signal.

14. The device of claim 12 further comprising:
- a line buffer, wherein the digital video data is clocked out of the line buffer according to the output video clock.

15. The device of claim 14 further comprising:
- an HDMI encoder configured to receive the digital video data from the line buffer.

16. The device of claim 12 wherein the pixel clock generator includes a digital phase lock loop of the CVBS decoder.

17. The device of claim 1 wherein the device is implemented as a silicon integrated circuit.

18. The device of claim 1 wherein the jitter requirements on the output video clock are specified by an HDMI standard.

19. The device of claim 1 wherein the jitter requirements on the output video clock are specified by requirements on an audio portion of the analog video signal.

* * * * *

UNITED STATES PATENT AND TRADEMARK OFFICE
CERTIFICATE OF CORRECTION

PATENT NO. : 9,883,082 B2  
APPLICATION NO. : 15/520349  
DATED : January 30, 2018  
INVENTOR(S) : Genlin Liu and Bing Zhang It is certified that error appears in the above-identified patent and that said Letters Patent is hereby corrected as shown below:

On the Title Page

In the Abstract (at (57)), Line 4, delete "The device output" and insert --The device outputs--.

In the Claims

Column 7, Claim 12, Line 10, delete "to generate a digital video" and insert --to generate digital video--.

Signed and Sealed this  
Tenth Day of July, 2018

Andrei Iancu  
*Director of the United States Patent and Trademark Office*